April 25, 1961 C. E. STAPLES ET AL 2,981,930

STATION TRANSFER CIRCUITS FOR REMOTE CONTROL SYSTEMS

Filed May 28, 1958

INVENTORS.
Crawford E. Staples and
Theophilus E. Hopkins
BY W. L. Stout
THEIR ATTORNEY 2,981,930

STATION TRANSFER CIRCUITS FOR REMOTE CONTROL SYSTEMS

Crawford E. Staples, Homewood, and Theophilus E. Hopkins, Trafford, Pa., assignors to Westinghouse Air Brake Company, Wilmerding, Pa., a corporation of Pennsylvania Filed May 28, 1958, Ser. No. 738,430

6 Claims. (Cl. 340—163)

Figure 1:
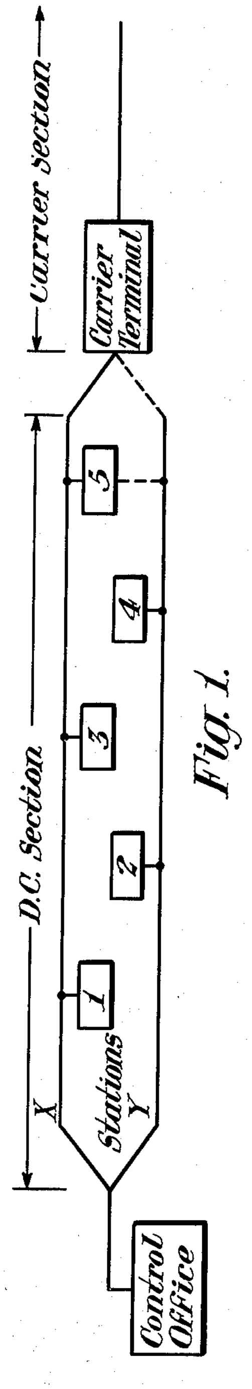

Our invention relates to station transfer circuits in remote control systems. More particularly, our invention relates to a control circuit arrangement whereby the line connections of a station unit in a remote control system may be transferred as desired between a normal communication channel and an alternate communication channel extending between one or more control office locations and the particular station.

In any remote control system, it is a distinct advantage to have a spare communication channel for transmission of the control and indication functions in the event the communication channel normally used is interrupted by a circuit failure. In this event, the spare or alternate communication channel may be substituted for the normal channel, and the operation of the system is thus continued. Where such spare channels are available, circuit arrangements to provide automatic changeover to these spare channels in the event of failure are known and are used in installations in service. In some control installations, two separate and distinct control channels terminate at the same remote station location. These two communication channels may originate at the same or at different control office locations. Alternately, they may originate at a field carrier location which is the equivalent, operationally, of the office location. At the field terminal location of the two channels, only a single station may be in service. However, the operation of the system may require that this single station be controlled over one of the communication channels at certain times and over the other communication channel at other times. Stating the problem in another fashion, assuming the two channels to originate at separate locations, one operator may be responsible for the control of the joint station under certain conditions, while under other conditions or periods, the operator of the other system may be responsible for the control of this particular remote station.

Such operation may exist, for example, in a railroad centralized traffic control installation where a particular remote location is a switching area in which a local operator may be responsible for switching movements while a system operator controls the remote station during periods when through train movements are being operated. Another example would be in the remote control of pipe line systems where a storage tank farm is located at a field station common to each of two control channels. The operator controlling over the first channel is responsible for the feed-in of the commodity being transmitted over the pipe line into the storage location, while a second operator handling the second system (channel) is responsible for the feed-out of the commodity from the storage location into the pipe line extending forward.

Occasionally, parallel but separated communication channels may be available where such a remote control system is operated so that a station may be controlled over an alternate channel during periods of maintenance work on the normal channel. In any of these situations, the ability to deliberately transfer the common station betwen the two communication channels, that is, from one to the other and vice versa, is necessary in order that the control may be shifted to meet the system requirements.

It is therefore an object of our invention to provide for station transfer between two communication channels in a remote control system.

It is also an object of our invention to provide control circuits which allow a deliberate transfer of a particular station in a remote control system from a normal to an alternate communication channel.

Another object of our invention is to provide circuit means to permit the remote control system operator to transfer the control of a particular remote station from a first to a second communication channel and vice versa.

Still another object of our invention is to provide a circuit arrangement at a remotely controlled station by which control of that particular remote station may be transferred at will from one operator working over a first line circuit to a second operator working over a second line circuit.

A still further object of our invention is to provide a control arrangement whereby a remotely controlled station may at times be connected to a first communication channel and at other times to a second communication channel as desired by the operator of the remote control system, the two parallel channels of which extend between the office location and the particular remotely controlled station.

It is also an object of our invention to provide a transfer control arrangement at a remotely controlled station by which control of that station may be deliberately transferred from a first control system to a second control system.

Other objects, features, and advantages of our invention will become evident from the following description when taken in connection with the accompanying drawings.

In practicing our invention, specifically in conjunction with any of the well known coded remote control systems, two communication channels are provided from a control office and are available at the remote station at which the station transfer action is desired. A line change-over stick relay is supplied as one of the control function stick relays associated with such a system. This line change-over stick relay is controlled on the next-to-the-last even-numbered step of the control code. The station at which the transfer action is provided is normally controlled over the first of the two line circuits or communication channels. When desired, the change-over function control is transmitted from the office location over this normally-used communication channel as part of a regular control code. The change-over stick relay is so energized as the result of this code that it operates to its reverse position and, as a stick relay, holds in that position. This reversal of the change-over stick relay deenergizes a repeater relay which controls the actual change-over operation. The eventual release of this slow release repeater relay transfers the station line connections to a second or alternate communication channel which likewise extends from the office to this location. It is to be understood, of course that this second channel may extend from a second office location to this particular station and thus provide for control by another operator during these special periods. The control arrangement at the office or offices is arranged to hold the change-over stick relay reversed over the alternate line circuit until such time as it is desired to return to normal operation. At this time, the opposite control function is transmitted from whichever office is controlling the station over the alternate line circuit. The reception of this code at the station causes the change-over stick relay to return to its original position and thus reenergize the change-over relay. This latter relay, upon reenergization, returns the station line connections to their normal condition, that is, to the normal connection to the first or primary communication channel. Each operation of the change-over relay is delayed, by suitable circuit arrangements, until the final code step so that the control function carried by the intervening odd-numbered code step will not be lost or distorted.

Referring to the drawings,

Fig. 1 thereof is a schematic showing of a specific remote control system, having two communication channels or line circuits, to which the arrangement of our invention may be added.

Figure 2:
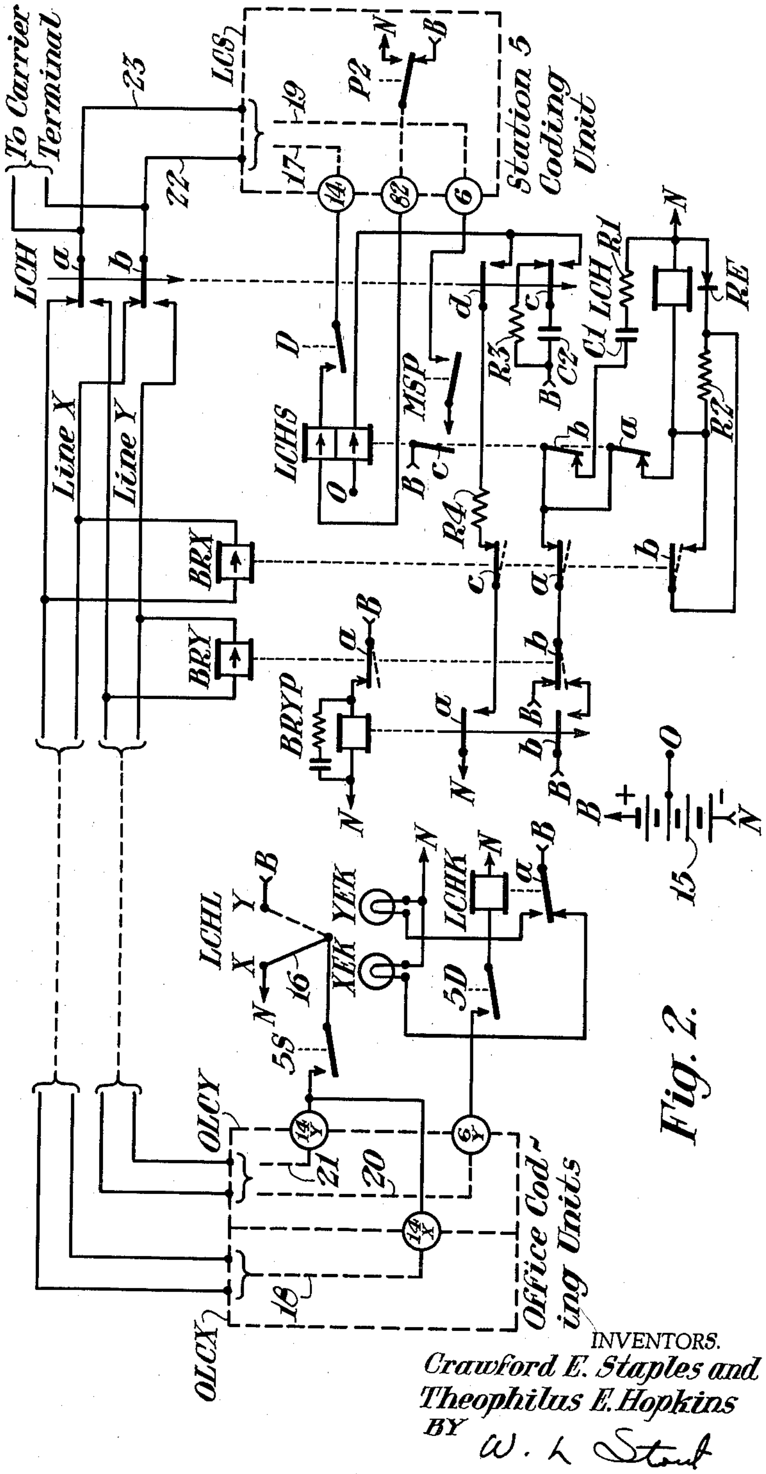

Fig. 2 of the drawings shows diagrammatically the circuit arrangement, partly by conventional symbols, which embodies the one form of our invention, as applied to the system of Fig. 1, particularly that portion located at the field station.

In each of the figures of the drawings, similar reference characters refer to similar parts of the apparatus.

In Fig. 1, there is shown conventionally a simplified form of a remote control system having two communication channels, designated by the reference characters X and Y, which extend from the control office location along parallel but separate routes to terminate at a single remote station location. Each channel is shown by a conventional single line representation originating at the left of the drawing at the control office which is shown in conventional block form. Five station locations are also shown by conventional block symbols connected to channels X and Y. The odd-numbered stations are connected to channel X while the even-numbered stations are connected to channel Y. It is obvious that the stations shown are representative only of the stations which may be controlled over the channels from the control office. Station 5 is provided with an alternate connection to channel Y, shown in Fig. 1 by a dotted line.

Each of the channels is indicated as a D.C. line circuit extending directly from the office location. It will be obvious to those skilled in the art that a carrier section may be interposed between the control office and the actual direct current line section for each of the channels. Also indicated in Fig. 1, by a conventional block, is a carrier terminal which controls a similar line section extending beyond station 5, the carrier currents for which are transmitted from the control office to the carrier terminal at station 5 over communication channel X superposed upon the direct current control therein. It is to be understood that the actual coupling of the carrier terminal to the line circuit section will be through a suitable coupling unit which, for simplicity, is not shown. An alternate connection from the carrier terminal to channel Y is indicated also by a conventional dotted line. It is obvious, therefore, that the control and indication functions for station 5 and the carrier currents from the office to the carrier terminal at station 5 may be transmitted over either of the channels extending between these locations, that is, over channel X or over channel Y. It is assumed that the normal connections for transmission of these codes are to channel X and that alternate connections may be established to channel Y as desired by the system operator. The system of our invention, as will be discussed hereinafter in detail, provides the control whereby station 5 and the carrier terminal may be transferred as desired from the one communication channel to the other and vice versa.

Having thus established a general control system used as a basis to specifically show the circuits of our invention, we refer now to Fig. 2 for the detailed arrangement. Herein is shown, partly in a conventional manner, the control arrangement by which station 5 and the carrier terminal may be transferred as desired between line circuits X and Y. In order to simplify the circuit arrangement and allow for an easier understanding, it will be considered, for purposes of this description, that all of the apparatus in Fig. 2 is supplied from a common source of direct current energy. Specifically, this source is shown, in the lower portion of Fig. 2, as a battery 15, of the proper size and capacity and having a positive terminal B, a negative terminal N, and a center tap terminal O. Wherever these reference characters appear in any other portion of Fig. 2, it will be understood that they refer to the corresponding terminal of battery 15. Another conventional symbol is used in the drawings to indicate the slow release characteristics of certain relays. This conventional symbol comprises a downward pointing arrow drawn through the movable portion of each of the contacts associated with the relay having the slow release characteristics. The actual release periods of such relays will be discussed hereinafter in connection with the description of the relay control.

In Fig. 2, the office location is shown at the left of the drawing. This office is connected to station 5, which is shown at the right of the figure, by two communication channels which are here shown as two-wire line circuits designated line X and line Y, corresponding to the similarly designated channels in Fig. 1. It is to be understood, of course, that other types of communication channels may be used with proper modification of the circuit arrangement and the use of such channels is considered to be covered by the scope of our invention. In Fig. 2, the connections to other remote stations from the associated line circuits are omitted for purposes of simplicity, this portion of each line circuit being indicated by a conventional dotted line. Communication between the control office and the station over each of the line circuits is by a coded remote control system. Such systems are provided with coding units at each location by which the control and indication functions are transmitted in the corresponding direction over the line circuits and received at the selected location. The details of such a system are not herein shown in their entirety in order to simplify the understanding of our invention. At the office and station shown in Fig. 2, the coding units are indicated by conventional dotted rectangles. The office coding units are shown by a double block, the left and right halves, respectively, being designated by the reference characters OLCX and OLCY to associate the individual coding unit with line X or line Y, respectively. The station coding unit is designated by the reference LCS.

The actual control system used may be the coded remote control system shown and described in Letters Patent of the United States No. 2,411,375, issued November 19, 1946, to A. P. Jackel for a Remote Control System. A similar system is also shown in Manual 506-A, entitled "Time Code Control System," reprinted October 1950 by the Union Switch & Signal, Division of Westinghouse Air Brake Company. It is assumed that such a system is here used and reference is made to these two prior publications for a description of the complete details of the system upon which our invention may be based. Thus, only such details are shown herein as are necessary to enable one to understand the operation and circuits of the system of our invention. It is to be understood, of course, that other similar coded remote control systems may be used and the circuit arrangement of our invention applied thereto.

At the office location, two coding units OLCX and OLCY are shown, one being provided for each communication channel or line circuit. However, it is possible at a single control location and if system operational requirements are met, to use only one office coding unit, since provisions may be made for a single coding unit to control the stations along two separate communication channel paths. As has been previously mentioned, the control office may be remotely located with a carrier section interposed between the actual control office and the beginning of the two communication channels, this system then including a field carrier location for converting between the carrier circuits and the direct current circuit shown herein. Such arrangements are well known and used in such remote control systems. However, as herein shown, the two coding units at the office are individually connected to the corresponding line circuits to transmit control codes and to receive indication codes as explained in the previously mentioned references. Referring to Fig. 1 briefly, coding unit OLCX transmits control codes over line circuit X to the odd-numbered stations of the system, while coding unit OLCY operates in a similar manner in connection with the even-numbered stations of the system. Each unit receives indication codes transmitted by the corresponding stations.

Also provided at the office, as part of the system of our invention, is a transfer control lever, otherwise defined as a line change-over lever and designated by the reference character LCHL. Only a single circuit connecting arm controlled by this lever is shown, designated by the reference character 16. The lever arm is shown as occupying its left-hand position but may also at times occupy a right-hand position shown dotted in the drawing. The two positions of the lever are designated by the reference characters X and Y to correspond to the line circuits associated with each position of the lever. The base of movable arm 16 is connected to terminals 14X and 14Y on the corresponding coding units over a normally open contact 5S. This contact 5S represents a contact on the station relay corresponding to field station 5. This relay is energized, so that the contact herein shown is closed, only when a control code is transmitted to this particular station, the contact remaining open at other times.

For purposes of understanding the present invention, it is sufficient to assume that, when a control code is transmitted to station 5, the closing of contact 5S during this code causes the preselected code step, herein code step 14, to be of a first or a second characteristic according as terminal N or B, respectively, of the direct current source is connected to either of the coding unit terminals designated by the references 14X and 14Y. Specifically, it is assumed that, if terminal N is connected to the terminals 14, as in the normal condition shown in the drawing with lever LCHL in its X position, the corresponding code step of the control code will have a first characteristic, specifically, will be of a short length. When terminal B is connected to terminal 14 of either coding unit, which occurs during a control code to station 5 with lever LCHL in its Y position, code step 14 will be of a second characteristic, that is, will have a long length. The circuits are thus conventionally shown to simplify the description of the operation, since the actual means of transmitting the transfer control function does not enter into the system of our invention. For a complete understanding and description of transmission of such control codes, reference is again made to the previously mentioned publications. It is assumed that the coded control system herein used transmits control codes of a 16-step length as explained in the references and the specific selection of code step 14 to carry the transfer function will be more fully explained hereinafter.

The office location is also provided with a transfer indication relay LCHK which is energized from terminal 6Y of coding unit OLCY over normally open contact 5D. Contact 5D represents a contact of delivery relay 5D of the reference system, which relay is energized and the contact closed only during the reception of an indication code from station 5. The complete control of relay LCHK will be described in more detail hereinafter. It is apparent, however, that this relay receives energy only in connection with the transmission of indication codes over the alternate line Y, a parallel connection to coding unit OLCX being unnecessary since the relay cannot be energized under those conditions. In its deenergized condition, relay LCHK establishes a circuit over its back contact *a* to energize indication lamp XEK, the lighted condition of this lamp indicating that station 5 is connected to line X. When the relay is energized, a similar circuit is established over front contact *a* to energize lamp YEK, the lighted condition of this lamp indicating that station 5 is connected to alternate line Y. It is obvious that only one of the indication lamps can be lighted at any one time.

At station 5 shown at the right of Fig. 2, our invention provides a transfer or line changeover stick relay LCHS which receives the transfer control function from the office. This relay is a two winding relay of the magnetic stick type. It thus has the characteristic that, when current flows in either or both windings in the direction of the arrow shown within each winding symbol, the relay operates its armature to its left-hand or normal position closing the left-hand or normal contacts as shown in the drawing. When current flows through either or both windings in a direction opposite to the arrow, the relay operates in such a manner as to close its right-hand or reverse contacts. However, upon deenergization of the relay windings, the contacts remain closed in the position to which they were last operated, holding in this position until the relay is energized in a manner to cause an opposite movement of the armature.

Relay LCHS is controlled by a circuit extending between terminals 14 and 82 on the station coding unit LCS, this circuit also including a contact D. Shown for simplicity outside unit LCS, this contact represents a front contact of the delivery relay at this station, which relay is energized and thus the contact closed, only when a control code selects this station for the reception of the control functions carried thereby. With the transfer control function assigned to code step 14, terminals 14 and 82, between which relay LCHS is connected, correspond to the terminals shown in Manual 506–A for relays controlled by the same code step. Inside coding unit LCS, the circuit from terminal 82 includes a transfer contact P2, representative of the contacts of relay P2 which is illustrated and explained in detail in the aforementioned Jackel patent. It is sufficient to understand that this relay P2 is energized near the end of each long even-numbered step of the code. Relay P2 then holds in this energized position during the succeeding odd-numbered code step. When the even-numbered code step is of a short characteristic, the relay is not energized and remains with its back contacts closed. Depending upon the relay position, contacts of relay P2 select between two control function registry circuits. The selected circuits is then completed, to register the transmitted control, at the beginning of the next code step. Specifically, it is obvious that, depending upon step 14 of the control code having a first or second characteristic i.e., short or long, relay P2 will remain deenergized or will be energized to connect, respectively, terminal B or terminal N of the direct current source to terminal 82. The direct connection of front and back contacts P2 to terminals N and B, respectively, continues the conventional showing of control code circuits previously discussed in connection with lever LCHL. The complete circuitry is shown in the reference publications but is unnecessary here.

A circuit within coding unit LCS to terminal 14 is completed during the fourteenth step of each control code received by and selecting this station, the circuit being retained for a brief interval into the following fifteenth code step. Such operation is shown and described in the aforementioned Jackel patent or Manual 506–A. The control circuits are herein shown conventionally, as previously discussed, in order to simplify the description and the drawings. For purposes of understanding the system shown, it may be considered that, during the control code transmitted to station 5 over line X, a circuit will exist at the end of a short fourteenth code step from terminal B at back contact P2 within unit LCS over terminal 82, the upper winding of relay LCHS, contact D which is now closed, terminal 14 of unit LCS, internal circuits of unit LCS represented by dotted line 17, the line connections 22 and 23 at station 5, front contacts *a* and *b* of a change-over relay LCH to be described in detail hereinafter, line X to the office, dotted line 18 conventionally representing the coding circuitry within unit OLCX, terminal 14X, contact 5S now closed, and arm 16 of lever LCHL in its X position to terminal N. Relay LCHS is thus held in its normal position in which it is shown in the drawing. Other circuits for controlling relay LCHS will be described and discussed hereinafter during the description of the operation of our system.

Two auxiliary line relays are provided at station 5, one for each line circuit. These relays, BRX and BRY, are of the biased relay type in keeping with the general system herein assumed. In the specific showing herein of direct current line circuits, these relays are normally energized so that their front contacts are closed. During control codes over the associated line circuit, each of these auxiliary line relays follows the coding action. As described in the aforementioned Jackel patent, each control code consists of alternate line-open and line-closed steps so that the relays are alternately deenergized and reenergized, their front contacts opening and closing as indicated in the drawing by the dotted lines showing the released position of each of the contacts. During indication codes when the polarity of the line circuits is reversed, these relays remain released during the entire indication code. Relay BRY is provided with a slow release repeater relay BRYP. This repeater relay is normally energized over front contact *a* of relay BRY and is provided with a capacitor-resistor snub connected in multiple with the relay winding. The snubbing arrangement provides sufficient retardation for relay BRYP to hold picked up during normal code following action of relay BRY. The retardation must also be sufficient to enable relay BRYP to retain its front contacts closed and its back contacts open during any complete indication code, when relay BRY remains released. However, if relay BRY remains released for a period exceeding the length of an indication code, relay BRYP will release to close its back contacts.

Also provided at station 5 is a line change-over or transfer relay LCH. This relay repeats the operation of relays LCHS and BRX. Relay LCH is normally energized over a circuit extending from terminal B over front contact *b* of relay BRY, front contact *a* of relay BRX, normal contact *a* of relay LCHS, and the winding of relay LCH to terminal N. Another energizing circuit for relay LCH replaces front contact *b* of relay BRY with the corresponding back contact and back contact *b* of relay BRYP. The utility of this circuit will become evident later. It is to be noted, however, that the contacts of relays BRY and BRYP may be eliminated if a single office coding unit controls the coding over both line circuits.

Relay LCH is provided with slow release characteristics by various snubbing arrangements. The principal snub consists of capacitor C1 and resistor R1, in series, connected in multiple with the winding of relay LCH over normal contacts *a* and *b* of relay LCHS. In other words, the snubbing circuit may be traced from the right-hand terminal of the winding of relay LCH through resistor R1, capacitor C1, and normal contacts *b* and *a* of relay LCHS to the left-hand terminal of the winding of relay LCH. This snubbing arrangement provides sufficient retardation that relay LCH will remain picked up, when deenergized, for a time period slightly exceeding the length of any control or indication code. Thus, relay LCH holds its front contacts closed during normal coding action when front contact *a* of relay BRX or front contact *b* of relay BRY periodically opens. Likewise, relay LCH holds up while front contact *a* of relay BRX or front contact *b* of relay BRY remains open during an indication code transmitted over line X or line Y, respectively.

A second snubbing circuit for relay LCH comprises the half-wave rectifier unit RE and resistor R2 connected in series across the winding of relay LCH, with back contact *b* of relay BRX connected to shunt the resistor as required. Resistor R2 is of sufficiently high resistance to substantially reduce the retardation effect of rectifier RE upon relay LCH. In other words, with resistor R2 in series with rectifier RE, the snubbing circuit is effective to add only a little retardation to relay LCH. However, when resistor R2 is shunted by back contact *b* of relay BRX so that rectifier RE is connected directly in multiple with the relay winding, relay LCH is provided with sufficient retardation, assuming for the present the interruption of the snubbing circuit through capacitor C1, to bridge a single open-circuit code step on line X whether the code step be of long or short duration.

Summarizing the snubbing arrangement for relay LCH, when normal contacts of relay LCHS are closed so that capacitor C1 and resistor R1 in series are connected in multiple with the winding of relay LCH, this latter relay is provided with sufficient retardation to bridge, when necessary, the entire length of an indication code. When normal contacts *a* and *b* of relay LCHS are open so that the capacitor snub is interrupted, relay LCH is provided with sufficient retardation, with back contact *b* of relay BRX closed, to bridge any single control code step on line X. However, when resistor R2 is connected in series with rectifier RE, the retardation provided to relay LCH is of very short duration and the relay will shortly release when deenergized.

Relay LCHS is provided with additional energizing circuits including its lower winding. The first of such circuits extends from terminal B through capacitor C2, back contact *c* of relay LCH, and the lower winding of relay LCHS in the direction opposite the arrow to terminal O of the battery. It is obvious that, if relay LCH releases to close its back contact *c*, a pulse of current flows in this last traced circuit through the lower winding of relay LCHS in the direction opposite to the arrow, causing relay LCHS to close its reverse contact. The duration of this pulse of current is limited by capacitor C2, but is of sufficient duration to cause relay LCH to operate. It is to be noted that capacitor C2 is provided with a discharging circuit including front contact *c* of relay LCH and resistor R3.

Another circuit for relay LCHS extends from terminal O through the lower winding of relay LCHS over back contact *d* of relay LCH, resistor R4, front contact *c* of relay BRX, and back contact *a* of relay BRYP to terminal N. When this circuit is completed, current flows through the lower winding of relay LCHS in the direction of the arrow and the relay operates to close its normal contacts. The utility of these auxiliary circuits for relay LCHS will appear shortly. The purpose of resistor R4 in the final circuit described is to limit the effective short circuit current which will flow, until capacitor C2 is charged, should back contact *a* of relay BRYP be closed when back contacts *c* and *d* of relay LCH close.

We shall now describe the operation of the system of our invention. Initially, we shall consider the operation in the event that line X is interrupted by some fault condition. If a fault condition occurs, interrupting the direct current line circuit from the office, relay BRX is deenergized and releases. Under these conditions, the relay remains released so that its front contacts remain open. The opening of front contact *a* of relay BRX obviously deenergizes relay LCH which holds with its front contacts closed due to the retardation provided by the capacitor-resistor snub comprising capacitor C1 and resistor R1. However, since relay BRX remains released, relay LCH eventually releases after a period in excess of the time of a single code cycle. The opening of front contacts *a* and *b* of relay LCH disconnects station coding unit LCS from line X and the closing of the corresponding back contacts of relay LCH connects unit LCS to line Y.

The closing of back contact *c* of relay LCH causes a pulse of current to flow through the lower winding of relay LCHS in the direction opposite the arrow, as previously described, during the charging period of capacitor C2. Relay LCHS operates to close its contacts in their reverse position. This causes the transmission of an indication code to the office which effects the energization of relay LCHK. This circuit may be traced, in a conventional manner, from terminal B at reverse contact *c* of relay LCHS over a contact MSP, shown outside the LCS unit for simplicity and which is closed only when this station transmits an indication code, terminal 6 of unit LCS, a circuit arrangement within the unit designated conventionally by dotted line 19, station line connections 22 and 23, and back contacts *a* and *b* of relay LCH to line Y, thence to the office and through the circuitry internal to unit OLCY designated conventionally by dotted line 20, terminal 6Y of the coding unit, contact 5D closed only during the reception of an indication code from station 5, and the winding of relay LCHK to terminal N. When relay LCHK, thus energized, picks up, it interrupts at its back contact *a* the circuit for lamp XEK and completes over its front contact *a* the circuit for lamp YEK, indicating to the system operator that a change-over action has occurred at station 5. Since this was not a deliberate change-over, it also indicates that line X is interrupted at some place by a fault. The operator then places lever LCHL in its Y position so that succeeding codes to station 5 will not cause a transfer action to return the station to line X until the latter line is repaired. The transfer of line connections 22 and 23 at station 5 likewise transfers to line Y the carrier terminal connected in multiple, through proper coupling units, with unit LCS. The operator will also take such action as is required to transfer the carrier circuits at his office from line X to line Y to complete the change-over action at both ends of such circuits.

The system of our invention, of course, provides a means whereby a deliberate change-over of station 5 from line X to line Y may be accomplished as required by the operation of this system. For such a deliberate change-over action, the system operator at the control office places lever LCHL in its Y position, shown dotted in the drawing, and initiates a control code to station 5. Under the existing conditions, terminal B is connected over contact 5S to terminal 14X of unit OLCX since arm 16 of lever LCHL is in its right-hand or Y position. The fourteenth step of this control code will thus be of long duration so that, at the station, relay P2 will be energized and pick up. At the beginning of the succeeding code step, that is, step 15, a conventional circuit is completed to energize relay LCHS. This circuit extends from terminal B over arm 16 of lever LCHL, contact 5S now closed, terminal 14X, circuits within unit OLCX indicated conventionally by dotted line 18, line X to station 5, front contacts *a* and *b* of relay LCH, line connections 22 and 23, circuits within unit LCS indicated by conventional dotted line 17, terminal 14 of unit LCS, contact D now closed, the upper winding of relay LCHS, terminal 82 of unit LCS, and front contact P2 to terminal N. The flow of current through the upper winding of relay LCHS is in the direction opposite to the arrow so that the relay operates to close its reverse contacts.

The opening of normal contact *a* of relay LCHS interrupts the circuit for relay LCH deenergizing this latter relay. At the same time the opening of normal contact *b* of relay LCHS interrupts the capacitor-resistor snub in multiple with the winding of relay LCH so that it is no longer effective to retain the relay picked up. At the beginning of the fifteenth code step, that is, at the time relay LCHS is energized, relay BRX is deenergized and releases since odd-numbered code step 15 is of a line-open characteristic. The closing of back contact *b* of relay BRX shunts resistor R2 so that rectifier RE is connected directly in multiple with the winding of relay LCH. As previously described, this rectifier snub provides sufficient retardation to relay LCH so that it will bridge any complete code step of the control code whether, the step be of long or short duration. Thus, relay LCH holds its front contacts closed during the fifteenth step of this control code. Since the transfer action thus does not occur during the fifteenth code step, the control function carried by this code step will be properly received without distortion at station 5 and no undesired operation occurs.

At the beginning of the sixteenth or final step of the code, relay BRX is reenergized by the closing of the office circuit to line X so that back contact *b* of relay BRX opens, inserting resistor R2 in series with the rectifier RE in the snubbing arrangement. The retardation of relay LCH is thus greatly reduced and the relay releases after a short period which is of sufficient length to insure the energization of the last step function registry relays and/or the completion of station circuits. Release of relay LCH transfers the line connections 22 and 23 of unit LCS at station 5 from line X over front contacts *a* and *b* of relay LCH to line Y over the corresponding back contacts. It is to be noted at this point that the system operator at the control office will have taken whatever steps are necessary to transfer the carrier channel from line X to line Y. Such circuits are thus interrupted for only a very short time during the transmission of this control code to accomplish the change-over at the station. The closing of reverse contact *c* of relay LCHS causes the transmission of an indication to the office following the completion of the control code which energizes indication relay LCHK which then picks up to energize lamp YEK and deenergize lamp XEK to indicate the completion of the change-over action.

When it is desired to transfer station 5 back to line X, whether the original transfer to line Y was a result of the deliberate action on the part of the system operator or resulted from the interruption of line X due to a circuit fault, the operator must place lever LCHL in its left-hand or X position and initiate a control code to station 5. During this control code, the fourteenth step which carries the control function for the transfer will be of short duration since terminal N is connected over arm 16 of lever LCHL and contact 5S to terminal 14Y. Unit OLCY is the controlling coding unit under the present conditions since station 5 is connected to line Y. At this time, the conventional circuit is traced from terminal B at back contact P2 in unit LCS to line Y at the station over a circuit including terminals 14 and 82 of unit LCS, the upper winding of relay LCHS, contact D, internal circuitry of unit LCS represented by dotted line 17, line connections 22 and 23, and back contacts *a* and *b* of relay LCH, and at the office extends from line Y through internal circuitry of unit OLCY indicated conventionally by dotted line 21, terminal 14Y of unit OLCY, contact 5S, and arm 16 to terminal N. This causes relay LCHS to operate to close its contacts in their normal position, this action occurring at the beginning of the fifteenth code step.

Although normal contact *a* of relay LCHS closes at this time, front contact *b* of relay BRY is open since the relay is released due to the odd-numbered code step being transmitted. Thus the circuit for relay LCH is not yet completed and the relay remains released. However, at the beginning of the sixteenth code step, the closing of front contact *b* of relay BRY completes the energizing circuit for relay LCH which then picks up transferring the line connections of unit LCS at station 5 from line Y to line X over front contacts *a* and *b* of relay LCH. This delay in the transfer action until the final step of the code prevents any interruption of a control function transmitted during the fifteenth step of the control code to station 5.

The opening of reverse contact *c* of relay LCHS causes the transmission of an indication code to the office following the completion of the preceding control code which deenergizes relay LCHK, causing it to release its contact *a*. Lamp XEK is now energized over back contact *a* while lamp YEK is deenergized by the opening of front contact *a* of relay LCHK. The lighting of lamp XEK indicates to the operator that the transfer action returning the connections of station 5 to line X has been completed.

If, during a period when station 5 has been transferred deliberately to line Y, a circuit fault occurs which interrupts line Y so that transmission to station 5 is no longer possible, the circuits are so arranged that a transfer of station 5 back to line X will automatically occur. The interruption of line Y by the circuit fault causes the deenergization and release of relay BRY, which remains continuously released under these conditions. After a time period slightly in excess of that of a control cycle, relay BRYP, deenergized when front contact *a* of relay BRY opened, will release. The closing of back contact *a* of relay BRYP completes a circuit for energizing relay LCHS, previously traced, the circuit also including front contact *c* of relay BRX, back contact *d* of relay LCH, and the lower winding of relay LCHS. This circuit results in the operation of relay LCHS to close its normal contacts. The closing of normal contact *a* of relay LCHS completes a circuit, at this time also including back contacts *b* of relays BRYP and BRY and front contact *a* of relay BRX, to energize relay LCH. This latter relay, thus energized, picks up and, as previously explained, transfers the line connections of the station 5 LCS unit to line X over front contacts *a* and *b* of relay LCH. Control of this station may thus be regained over the operative line circuit. Again, the opening of reverse contact *c* of relay LCHS causes the transmission of an indication code to the office which results in deenergization of relay LCHK which in turn energizes lamp XEK to indicate to the operator that the change-over has occurred. The operator is thus notified that line Y is interrupted by a circuit fault so that he may take the proper action. In addition, he places lever LCHL in its X position so that succeeding codes to station 5 will not cause any change-over action at the present time.

If line Y is interrupted by a fault while station 5 is connected to line X, the release of relay BRY, opening its front contact *b*, deenergizes relay LCH. However, relay BRYP is likewise deenergized by the opening of front contact *a* of relay BRY. The slow release period of relay BRYP is arranged to be slightly shorter than that of relay LCH so that the former relay releases first. This completes the second energizing circuit for relay LCH including back contacts *b* of relays BRY and BRYP, front contact *a* of relay BRX, and normal contact *a* of relay LCHS. Relay LCH is thus reenergized prior to its release and continues to hold station 5 connected to line X.

The circuit arrangements of our invention thus provide for the deliberate change-over of a station in a remote control system from one communication channel to an alternate communication channel in order that the station may be controlled by different systems. These systems, as previously described, may originate at different control offices so that the control of a particular field station my be shifted from one operator to another as circumstances and the operation of the complete system require. This change-over action may be accomplished without interference to the existing conditions of other apparatus at the station which are likewise controlled by the remote control system.

Although we have herein shown and described but one form of circuit arrangement embodying the station transfer circuits of our invention, it is to be understood that various changes and modifications may be made therein within the scope of the appended claims without departing from the spirit and scope of our invention.

Having thus described our invention, what we claim is:

1. In a coded remote control system including an office location and at least one field station location, said system having a normal and an alternate communication channel between said office and said station, said office having connections to both channels to at times transmit control functions in the form of stepped control codes of predetermined length over each channel, each code step having a first or a second characteristic as determined by the control function transmitted, said station having channel connections adapted to connect the station to any communication channel to receive the control codes designated for that station, apparatus to transfer said station channel connections from the normal channel to the alternate channel and vice versa as desired for system operation, comprising a control stick relay operable to a first position and to a second position, an energizing circuit network for said stick relay completed only in response to reception of a preselected code step, said circuit network being effective to operate said stick relay to its first position when said preselected code step is of said first characteristic and to its second position when said preselected code step is of said second characteristic, and transfer means controlled by contacts of said stick relay for transferring said station channel connections between said normal channel and said alternate channel as said stick relay occupies its first and second positions respectively.

2. In a coded remote control system including an office location and at least one field station location, said system having a normal and an alternate communication channel between said office and said station, said office having connections to both channels to at times transmit control functions in the form of stepped control codes of predetermined length over each channel, each code step having a first or a second characteristic as determined by the control function transmitted, said station having channel connections adapted to connect the station to any communication channel to receive the control codes designated for that station, apparatus to transfer said station channel connections from the normal channel to the alternate channel and vice versa as desired for system operation, comprising a control stick relay operable to a first position and to a second position, an energizing circuit network for said stick relay completed only in response to reception during each code of a preselected code step, said circuit network being effective to operate said stick relay to its first position when said preselected code step is of said first characteristic and to its second position when said preselected code step is of said second characteristic, a transfer relay and energizing circuit arrangement therefor including a first position contact of said stick relay, a first delay circuit means having connections to said transfer relay and responsive to the portion of a control code following said preselected code step for delaying the operation of said transfer relay to its deenergized position until the final step of that code, and a second delay circuit means also having connections to said transfer relay and responsive to the portion of a control code following said preselected code step for delaying the energization of said transfer relay until the final step of that code, contacts of said transfer relay being interposed in said station channel connection to transfer said connections between said normal channel and said alternate channel as said transfer relay occupies its energized and deenergized position respectively.

3. In a coded remote control system including an office location and at least one field station location, said system having a normal and an alternate communication channel between said office and said station, said office having connections to both channels to at times transmit control functions in the form of stepped control codes of predetermined length over each channel, each code step having a first or a second characteristic as determined by the control function transmitted, said station having channel connections adapted to connect the station to any communication channel to receive the control codes designated for that station, apparatus to transfer said station channel connections from the normal channel to the alternate channel and vice versa as desired for system operation, comprising, a control stick relay operable to a first position and to a second position, an energizing circuit means for said stick relay responsive only to the reception of a preselected code step for operating said stick relay to its first position when said preselected code step is of said first characteristic and to its second position when said preselected code step is of said second characteristic, a transfer relay and an energizing circuit therefor including a first position contact of said stick relay, contacts of said transfer relay being interposed in said station channel connections to transfer said connections between said normal channel and said alternate channel as said transfer relay occupies its energized and deenergized position respectively, an auxiliary relay means responsive to the transmission of a control code over either of said channels, and a delay circuit means controlled by contacts responsive to the operation of said auxiliary relay means and having connections to said transfer relay for retarding each operation of said transfer relay between its two positions from the end of said preselected code step until the final step of that control code.

4. In a coded remote control system including an office location and at least one field station location, said system having a normal and an alternate communication channel between said office and said station, said office having connections to both channels to at times transmit control functions in the form of stepped control codes of predetermined length over each channel, each code step having a first or a second characteristic as determined by the control function transmitted, said station having channel connections adapted to connect the station to any communication channel to receive the control codes designated for that station, apparatus to transfer said station channel connections from the normal channel to the alternate channel and vice versa as desired for system operation, comprising, a control stick relay operable to a first and a second position, an energizing circuit for said stick relay completed during each control code only in response to reception of a preselected code step, said energizing circuit being effective when completed to operate said stick relay to its first position when said preselected code step is of said first characteristic and to its second position, when said preselected code step is of said second characteristic; a transfer relay operable between a first and a second position and a control circuit network therefor including first position contacts of said stick relay, contacts periodically opened in response to the transmission of control codes over each channel, and a relay retardation element; said control circuit network being effective to operate said transfer relay to its first and second positions according as said preselected code step is of said first and said second characteristic respectively, each transfer relay operation being delayed at times by said retardation element and at other times by the code responsive contacts until the final step of the corresponding control code; contacts of said transfer relay being interposed in said station channel connections to transfer said connections between said normal channel and said alternate channel without loss of any control function as said transfer relay occupies its first and second position respectively.

5. At a station in a remote control system, said system including a first and a second line circuit over each of which stepped control codes which said station is adapted to receive are at times transmitted from control locations, the combination comprising, station line connections, a control function stick relay operable to a first and a second position as a predetermined code step of a received control code has a first and a second characteristic respectively, a transfer relay and an energizing and a retardation circuit network therefor, said energizing circuit including a first position contact of said stick relay and contacts periodically open in response to coding on each line circuit, at least one of said code-responsive contacts being open during each time said stick relay is operated, said retardation network including a snubbing element and another contact periodically closed in response to coding on said first line circuit, said other contact being effective when open to cancel the retardation of said transfer relay effected by said snubbing element, said other contact being closed during the period following said predetermined step of a control code until the end of that control code to retain said transfer relay in its energized position when said stick relay is operated to its second position during that code, contacts of said transfer relay being interposed in said line connections to connect said station to said first and said second line circuits as said transfer relay occupies its energized and its deenergized position respectively.

6. At a station in a remote control system, said system including a first and a second line circuit over each of which control functions in the form of stepped control codes which said station is adapted to receive are transmitted from at least one control location, the combination comprising, a control function stick relay operable to a first position and to a second position in response to the reception of a control function having a first and a second preselected characteristic respectively during a predetermined step of a control code, a line transfer relay and an energizing and a retardation circuit network therefor, and line circuit connection means, said energizing circuit for said transfer relay including a first position contact of said stick relay and a normally closed code following contact which remains open in response to the reception of a control code over said first line circuit from said predetermined code step to the final code step, said retardation network having a first path with connections to said transfer relay and including a first position contact of said stick relay and a retardation device effective when connected to retain said transfer relay in its energized position during an entire code, said retardation network having a second path with connections to said transfer relay and including another retardation element effective to retain said transfer relay in its energized position from said predetermined step to the end of a code connected in series with a resistor and a normally open code following contact in multiple, said normally open contact being closed during a control code transmitted over said first line circuit to shunt said resistor from the end of said predetermined step to the final step of the code, said resistor being effective when the contact shunt is open to cancel the retardation effect on said transfer relay by said other retardation element, contacts of said transfer relay being interposed in said line connections to connect said station to said first and said second line circuits as said transfer relay occupies its energized and deenergized positions respectively.

References Cited in the file of this patent

UNITED STATES PATENTS

| | | |
|---|---|---|
| 2,135,295 | Stewart | Nov. 1, 1938 |
| 2,634,401 | Hill | Apr. 7, 1953 |